(12) United States Patent  
Carter (10) Patent No.: US 9,122,759 B2  
(45) Date of Patent: Sep. 1, 2015

(54) SYSTEMS AND METHODS FOR ONLINE SOCIAL MATCHMAKING

(71) Applicant: Steve Carter, Pasadena, CA (US)

(72) Inventor: Steve Carter, Pasadena, CA (US)

(73) Assignee: EHARMONY, INC., Santa Monica, CA (US)

( * ) Notice: Subject to any disclaimer, the term of this patent is extended or adjusted under 35 U.S.C. 154(b) by 270 days.

(21) Appl. No.: 13/718,981

(22) Filed: Dec. 18, 2012

(65) Prior Publication Data

US 2014/0172893 A1     Jun. 19, 2014

(51) Int. Cl.  
*G06F 17/30* (2006.01)

(52) U.S. Cl.  
CPC .... *G06F 17/30867* (2013.01); *G06F 17/30766* (2013.01); *G06F 17/30861* (2013.01)

(58) Field of Classification Search  
CPC ............... G06F 17/30867; G06F 17/30766; G06F 17/30861  
USPC ................................ 707/732, 749, 758, 748  
See application file for complete search history.

(56) References Cited

U.S. PATENT DOCUMENTS

| | | | |
|---|---|---|---|
| 8,060,463 B1* | 11/2011 | Spiegel ................ | 707/609 |
| 8,225,413 B1* | 7/2012 | De et al. ................ | 726/26 |
| 8,234,143 B1* | 7/2012 | Brewer et al. ......... | 705/7.14 |
| 2009/0063284 A1* | 3/2009 | Turpin et al. .......... | 705/14 |
| 2009/0063630 A1* | 3/2009 | Obasanjo et al. ..... | 709/204 |
| 2009/0150798 A1* | 6/2009 | Park et al. ............. | 715/751 |
| 2010/0179874 A1* | 7/2010 | Higgins et al. ........ | 705/14.53 |
| 2011/0214068 A1* | 9/2011 | Neal et al. ............. | 715/751 |
| 2012/0047448 A1* | 2/2012 | Amidon et al. ........ | 715/753 |
| 2012/0117581 A1* | 5/2012 | Curtis et al. ........... | 725/9 |
| 2014/0108527 A1* | 4/2014 | Aravanis et al. ....... | 709/204 |

* cited by examiner

*Primary Examiner* — Phong Nguyen  
(74) *Attorney, Agent, or Firm* — One LLP (57) ABSTRACT

A computer-based system for presenting interpersonal relationship recommendation that utilizes peer based opinions about a potential match to influence the recommendation, and that presents the peer based opinions along with the recommendation.

14 Claims, 5 Drawing Sheets

SYSTEMS AND METHODS FOR ONLINE SOCIAL MATCHMAKING

FIELD OF THE INVENTION

The field of the invention relates to systems and methods for the operation of a matching service utilizing peer-review.

SUMMARY OF THE INVENTION

The systems and methods described herein relate generally to presenting interpersonal relationship recommendations utilizing peer based opinions about a potential matching of users to influence the recommendation. Third party peers may submit a review of the potential matching indicating the perceived likelihood that the potential matching will result in a satisfactory relationship, and the submitted reviews may be utilized in the generation of a social rating that influences whether the potential matching is recommended.

Other systems, methods, features and advantages will be apparent to one of ordinary skill in the art from the following figures and detailed description, which illustrate, by way of example, the principles of the present invention.

BRIEF DESCRIPTION OF THE DRAWING(S)

Illustrated in the accompanying drawing(s) is at least one of the best mode embodiments of the present invention In such drawing(s).

DETAILED DESCRIPTION OF THE PREFERRED EMBODIMENTS

The herein described drawing figures illustrate the invention in at least one preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present system and method.

Figure 1:
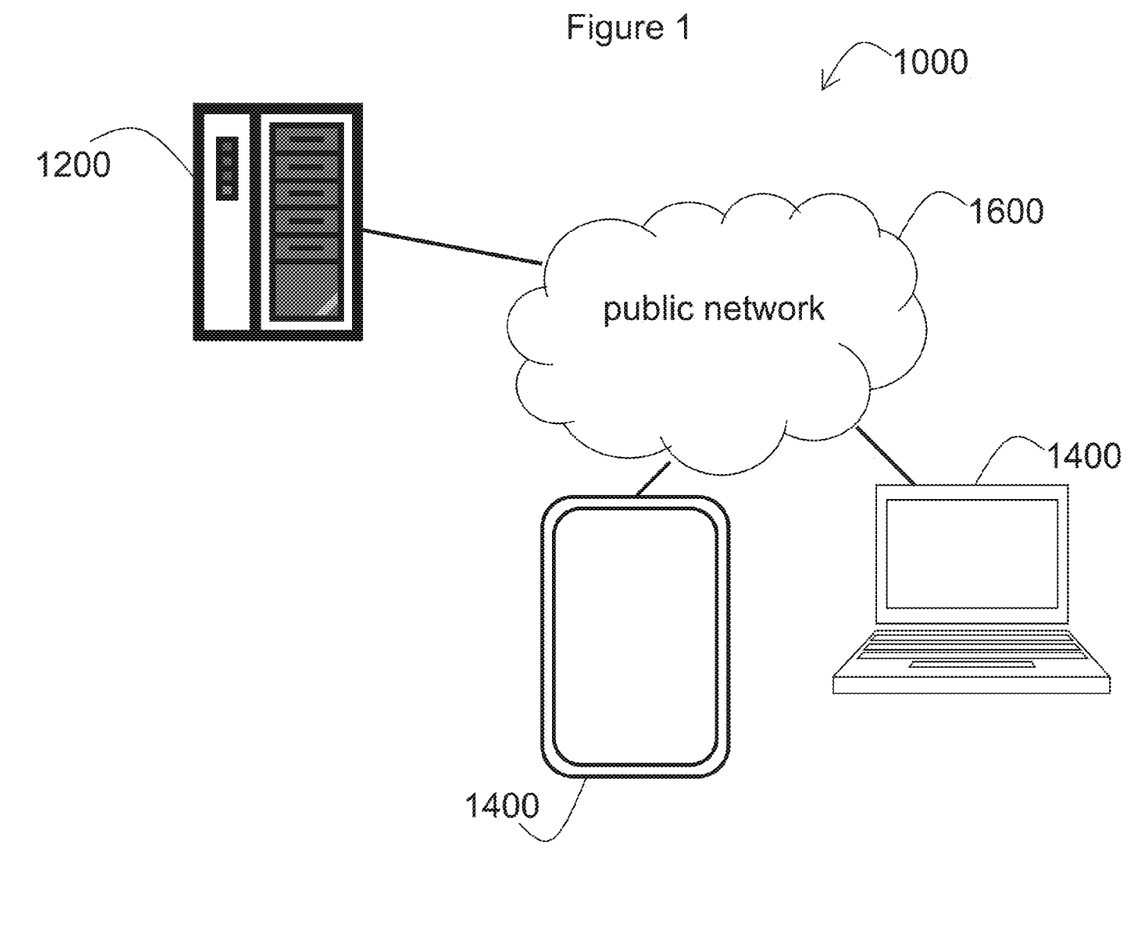
FIG. 1 is an exemplary diagram of an online interpersonal match system according to a preferred embodiment of the present invention.

FIG. 1 shows a computer-based matching system 1000 in accordance with a preferred embodiment of the present invention. The system generally includes a matching server system 1200, which may be distributed on one or more physical servers, each having a processor, a memory, an operating system, an input/output interface, and a network interface, all known in the art, and a plurality of end user interface devices 1400 coupled to a public network 1600, such as the Internet and/or a cellular-based wireless network.

Figure 2A:
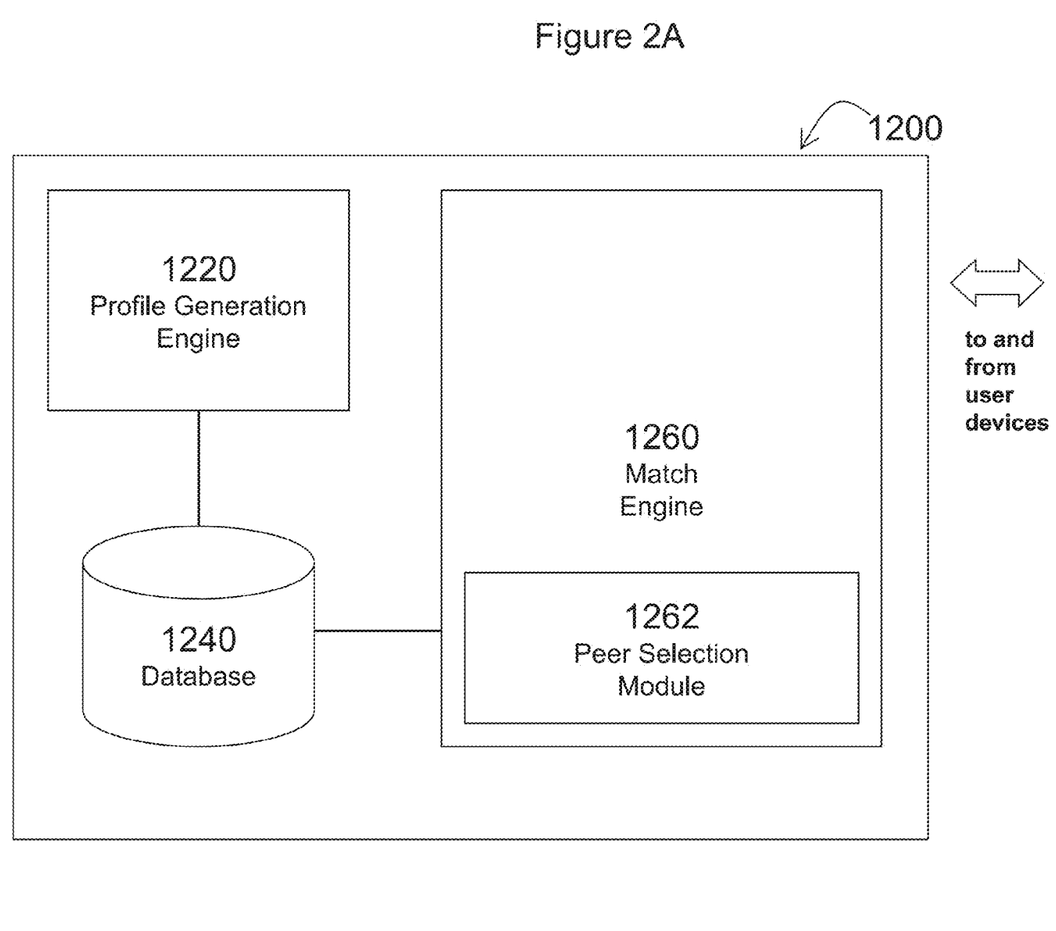
FIG. 2A is an exemplary diagram of a matching server system according to a preferred embodiment of the present invention.

An exemplary embodiment of the matching server system 1200 is shown in FIG. 2A. The matching server generally includes a computer application designed to match users based at least in part on social recommendation. Grouped user profiles are presented to peers for review and potential matches are presented to respective users according to peer-review.

To identify potential matches, i.e. other users with whom there is a likelihood of a successful interpersonal relationship, each user establishes a profile that includes data and/or factors potentially relevant to establishing a successful interpersonal relationship for that user. The data and/or factors may be indicative of qualities desired of the potential match and/or desirable as the potential match. These factors are generated by a profile generation engine 1220 from data collected from the user. For example, users of the system may be required to provide the following information: one or more photos, age, what age they would like their potential match to be, zip code, occupation, a description of their life goal, the type of relationship they are seeking (e.g. friendship, casual dating, long term relationship, marriage) and other self descriptive responses which may be used to describe the users' personality, values, beliefs and preferences. This information may then be used to generate the user's profile, which may contain one or more factors generated based on the provided information. The profiles may be stored in a database 1240 and organized by the user's profile identification.

As shown in FIG. 2A, a match engine 1260 is communicatively coupled to the database 1240. In the process of identifying potential matches for the user, the match engine 1260 queries the user's profile by its respective profile identification, and algorithmically correlates the user's profile with other profiles to calculate match values. If a match value generated by the correlation meets a predefined threshold, then there is potential for the respective users to have a satisfactory and/or successful interpersonal relationship if matched.

In the course of calculating the match values, the match engine 1260 correlates the user's profile to other profiles to form a grouping of two or more users. The match engine 1260 then presents profile information of the respective grouped users, which may include profile data (e.g. photo, age, occupation, political affiliation, etc.) to one or more peers for review. These peers may be third party participants, or other users of the system.

Figure 3:
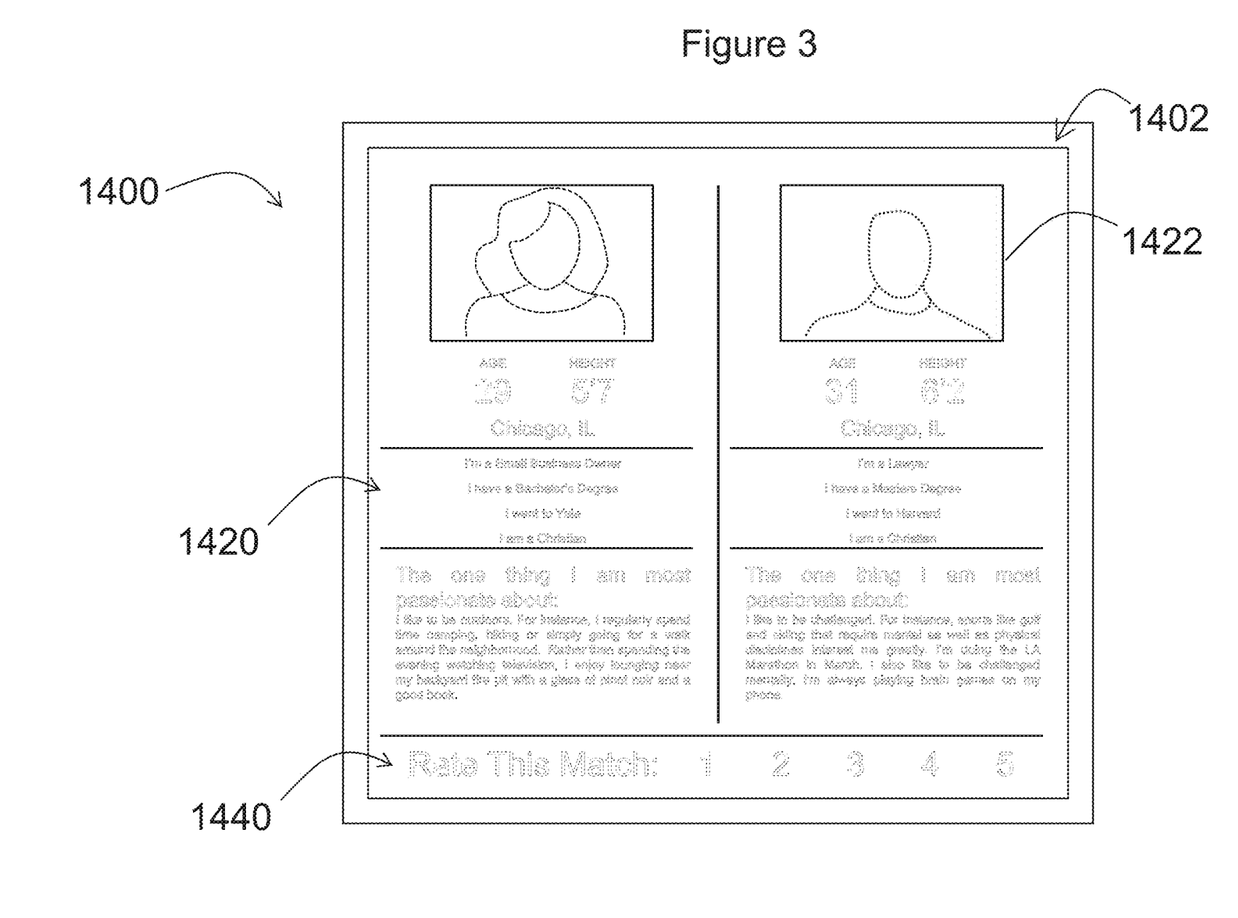
FIG. 3 is an exemplary diagram of a user interface device display of a grouping according to a preferred embodiment of the present invention.

FIG. 3 shows an exemplary diagram of a presentation of the grouping via a visual display 1402 of the user interface device 1400. Preferably, the grouping consists of a pair of respective users. The respective profile data 1420 of the grouped users is juxtaposed for comparison by the peer. The profile data 1420 may include respective photos 1422 of the grouped users and/or other factors that may be highly determinative of relationship success. Such factors may include, but are not limited to, for example: age, location, smoker vs. non-smoker, pet-friendly vs. not, education level, marital status, desirous of or having children, occupation, and/or a variety of personality, values, beliefs and preference factors. Additionally, the profile data 1420 may include respective user responses to various stimuli (e.g. written answers to questions) used in generating the profile.

Presented to the peer in conjunction with the grouping are one or more response fields 1440 for accepting peer-responses that may be indicative of the reviewing peer's prediction of the likelihood of a successful relationship for the grouping. The peer-response may be a numerical indicator predictive of a successful relationship. For example, a selected value of 4 on a scale of 1-5 may indicate that the peer believes the the grouping is likely (but not highly likely) to have a successful relationship. In presenting the grouping for peer-review, the response fields 1440 may require that the reviewing peer select a value indicating a degree of agreement/disagreement to one or more questions about the pairing, such as: "Is this a good match;" or "How likely is this couple to have a good first date." Numerical values and/or non-numerical values may be required as responses. For example, a percentage estimate may be required. The match engine 1260 is configured to receive the peer-responses and to store them in the database 1240 according to the respective user's profile identification and/or a grouping identification.

Turning back to FIG. 2A, the match engine 1260 is configured to retrieve the peer-responses and to calculate one or more social ratings for the grouping therefrom. The social rating is then stored in the database 11240 and organized according to one or more of: the associated peers, and the associated grouping or its respective users. In the process of calculating the social rating for the grouping, the match engine 1260 queries the database 1240 by user profile identification and/or grouping identification and applies a social rating algorithm to the retrieved peer-responses. The social rating is an aggregate of the peer-responses, and may be an average, adjusted average, or other aggregate indicating the overall peer response. For example, the social rating may be calculated by the following algorithm:

$$(\text{sum}(\text{value\_peer-response}))/(\#\_\text{of\_peers})$$

The match engine 1260 then generates the match value from at least the social rating. In at least one embodiment, the match value equals the social rating. In at least one other embodiment, the match engine 1260 generates the match value from the social rating and one or more of the herein identified factors potentially relevant to establishing a successful interpersonal relationship. For example, the match value may be calculated according to the following algorithm:

$$(\text{Male Age Fit} + \text{Female Age Fit} + \text{Distance Fit} + \text{Social Rating})/4$$

where:

$$\text{Male Age Fit}:(1-|\text{Male Age}-\text{Female's Target Age}|/\text{Female Target Age})$$

$$\text{Female Age Fit}:(1-|\text{Male's Target Age}-\text{Female Age}|/\text{Male Target Age})$$

$$\text{Distance Fit}:(1-\text{male zip code centroid to female zip code centroid distance in miles}/50)$$

In at least one embodiment, the peers are users who themselves have profiles, and the one or more social ratings are calculated according to the profiles of the peers. The social ratings may be calculated according to common factors among reviewing peers. For example, one social rating for a particular grouping may be the social rating calculated from the peer-responses of peers who are of a particular gender, relationship status, location, occupation, education, etc. The social ratings may be calculated according to the accuracy of the peer in previous predictions. For example, the peer-response of a particular peer whose past predictions of relationship success closely align with reports of the respective users of the previously reviewed grouping, may be given more weight in the calculation of the current social ratings.

As discussed herein, if the match value generated by the grouping meets a predefined threshold, then there is potential for the respective users to have a satisfactory and/or successful interpersonal relationship if matched. If the match engine 1260 determines that the match value generated from the correlation of respective user's profiles meets the predefined threshold, the match engine 1260 may present the respective users with their potential match. This may take the form of presenting profile data of the potential match (e.g. photo, age, sex, location, etc.). The respective users may then determine whether to follow-up on the suggested grouping. Preferably, this follow-up includes initiating and/or otherwise allowing varying degrees of further contact between the respective users of the grouping in the firm of, for example, e-mail, electronic messaging, video chat, telephone, or in-person meeting. Preferably, the user is presented with profile data 1420 of the potential match (and vice versa) via the user interface device 1400.

In addition to presenting match profile data 1420, the match engine 1260 may also present the social rating of the grouping to the respective users. Accordingly, in some embodiments, the social rating may also be indicative of a percentage of peers that predict a successful relationship. The users may then determine, based at least partially on the social rating, whether to follow-up on the suggested grouping, as described herein. In this manner, the user is given social feedback regarding the likelihood of a successful relationship with the potential match that may assist the user in determining whether to follow-up on the suggested match by providing a "human" element to the process.

In at least one embodiment, the match value is periodically updated to incorporate newly received peer-responses. As described herein, the match engine 1260 may be configured to retrieve the peer-responses and calculate the social rating therefrom. When a new peer-response is received by the match engine 1260, the match engine 1260 may query the database 1240 for the social ratings associated with the grouping. The match engine 1260 may then recalculate, or otherwise incorporate the new peer-response into the social rating. The new peer-response and the updated social rating may then be stored in the database 1240, as described herein. Thus, as the grouping continues to be reviewed, the social rating (and therefore the match value) is kept substantially current. In this way potential matches may be presented that would not have otherwise been presented (or vice versa).

Exemplary peer selection according to at least one embodiment will now be described with reference to FIG. 2A. As shown in FIG. 2A, the match engine 1260 preferably comprises a peer-selection module 1262 communicatively coupled to the database 1240 and configured to associate peers with grouping for the peer-review process described herein. As discussed herein, these peers may be third party participants, or other users of the system. The peer-selection module 1262 identifies the peer and causes the match engine 1260 to present the grouping to the peer. In the course of identifying the peer, the peer-selection module 1262 preferably verifies that the peer is not part of the grouping. Furthermore, the association of peers with grouping may occur randomly. Preferably, the association of peers with groupings is so as to ensure the efficient distribution of grouping to reviewing peers. In at least one embodiment, the peer-selection module 1262 keeps track of the peers associated with the particular grouping, and re-presents the grouping to the peer for quality control purposes.

An exemplary embodiment of the matching server system 1200 utilizing compatibility determinations in calculating the match value will now be described with reference to FIG. 2B. It will be understood that parallel elements to FIG. 2A have similar functionalities.

As discussed herein, to identify potential matches, each user establishes a profile that can be a "match profile" including data and/or factors potentially relevant to establishing a successful interpersonal relationship for that user. These factors can generally be organized into three major categories: (1) user defined requirements for a partner (i.e. age, ethnicity, location, etc.) and descriptions of the user which can be used to identify reciprocal "fit" with other users' requirements; (2) interpersonal interests, traits and psychometrics personality traits, lifestyle, hobbies, favorite leisure activities, personal values, etc.) that are explicitly stated and/or inferred from self-generated data such as user responses to survey questions; and (3) psychological and physiological traits which may directly measured or observed through behavioral or physical assessment (i.e., cognitive speed, humour responses, blood cortisol etc.). As described herein, these factors are generated by the profile generation engine 1220 from data collected from the user, and may be stored in the database 1240 and organized by the user's profile identification. Exemplary approaches to establishing match profiles for users are described in detail in U.S. Pat. No. 7,454,357, issued to J. Galen Buckwalter et al. on Nov. 18, 2008 (the "Buckwalter patent") and U.S. patent application Ser. No. 13/395,978, filed by Steve Carter, et al. on Aug. 1, 2012 (the "Carter application"), which are both hereby incorporated in their entirety.

Figure 2B:
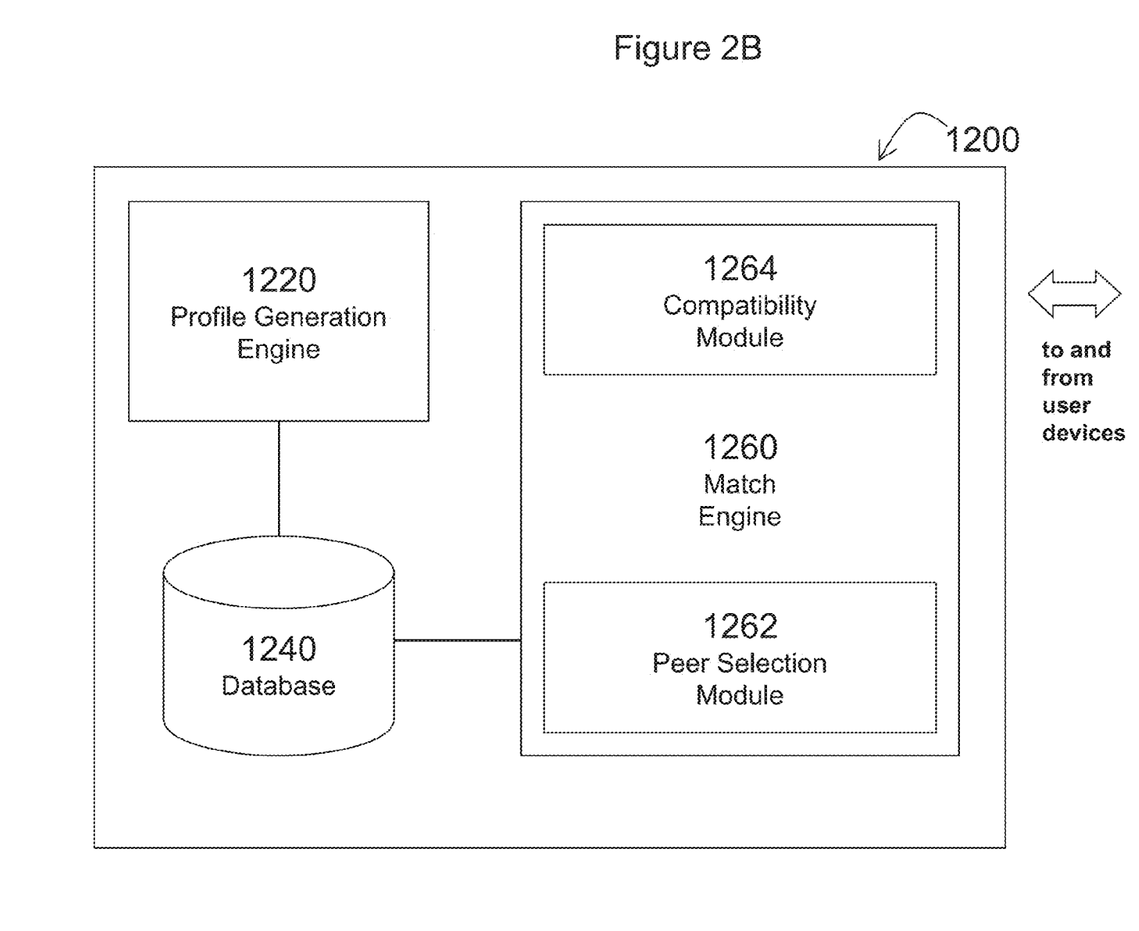
FIG. 2B is an exemplary diagram of a matching server system according to a preferred embodiment of the present invention.

As shown in FIG. 2B, the match engine 1260 may further comprise a compatibility module 1264. In the process of identifying potential matches for a particular user, the compatibility module 1264 may query the users match profile by its respective match profile identification, and correlate the profile with other profiles to calculate a compatibility value. If two profiles generate a compatibility value that meets a predetermined threshold, then there is a potential for the two respective users to have a satisfactory and/or successful interpersonal relationship if matched. In at least one embodiment, the calculation of compatibility value exceeding the predetermined threshold may cause the match engine 1260 to present the potential match to the user according to the descriptions herein. This calculation can also incorporate data based on a user's previous history of matches and satisfaction rate as well as the history of other user's with comparable empirical data, thereby enabling a feedback system that allows the system to "learn" how to optimize the compatibility calculation. This process can also involve developing and utilizing a "neural network" to resolve problems in complex data. Details of this calculation and correlation process and the neural network are also described in the Buckwalter patent, which describes an exemplary compatibility value in the form of a "satisfaction index."

Preferably, the compatibility module 1264 is configured to generate more than one compatibility value between two or more correlated match profiles, where each compatibility value is associated with a different type of relationship, e.g. dyadic, romantic, friendship, business, social, recreational, team oriented, long-term, or short term (e.g. minutes, hours, days or months). Each type of relationship may involve the use of different factors and/or different weighting of factors from the various categories described herein.

If the match engine 1260 determines that the compatibility value generated from the correlation of respective users match profiles meets the predetermined threshold the grouping may be presented to peers for review according to the description herein. Also as described herein, the match engine 1260 may be configured to retrieve the peer-responses and to calculate one or more social ratings for the grouping. The match engine 1260 may then calculate the match value for the grouping according to the generated social ratings and compatibility values associated therewith. In at least one embodiment, the predetermined threshold is a null threshold and all groupings undergo the peer-review process.

As discussed herein, if the match engine 1260 determines that the match value meets the predefined threshold, the match engine 1260 may present the respective users with the match profile data 1420 of the potential match so that the respective users may determine whether to initiate or otherwise allow varying degrees of further contact with each other. In addition to presenting match profile data 1420, the match engine 1260 may also present the social rating of the grouping to the respective users. The user may then determine, based at least partially on the social rating, whether to follow-up on the suggested grouping.

In at least one embodiment, the peer-review process may be utilized to present potential matches that would not have been presented by solely relying on the compatibility value, or to withhold potential matches that would otherwise have been presented by solely relying on the compatibility value. For example, the match engine 1260 may first present potential matches based on the grouping's compatibility value, and then, after the peer-review process, the match engine 1260 may present potential matches (or withhold otherwise potential matches) based on the grouping's match value, incorporating the social rating. Additionally, as described herein, as the grouping continues to be reviewed, the social rating (and therefore the match value) may be updated accordingly. In this way potential matches may be presented that would not have otherwise been presented (or vice versa). In at least one embodiment, the calculation and recalculation of the social rating may be discontinued after a predetermined number of peer-reviews have been received, or after the expiration of a predetermined time period. In at least one embodiment, presentation of the potential match to the user may not be accomplished until after a predetermined number of peer-responses are received. In at least one embodiment, the presentation of the potential match does not occur until after at least one iteration of the peer-review process.

In at least one embodiment, the peers are users with profiles and the peer is selected according to his/her profile data. Also shown in FIG. 29, the peer-selection module 1262 may query the database 1240 for peer profiles so as to select which peers to associate with the particular grouping. As discussed herein, each peer-review may be associated with the profile of the reviewing peer, and the social ratings may be calculated according to common factors among reviewing peers of a particular grouping. In addition to the examples described herein, the weight given to a particular peer-review may be according to the match value calculated between the peer and the user. For example, a particular peer-review may be given more weight in the social rating calculation if the reviewing peer is also a potential match in another grouping. Additionally, peers may be selected according to a past or present relationship with the respective users of the grouping. For example, the peer may be selected, in part, because the peer is a family member, friend or are otherwise acquainted with one or more of the respective users.

As mentioned herein, the profile generation engine 1220 may be communicatively coupled to the database 1240 which stores the peer-reviews organized according to the reviewing peers and the respective users of each grouping. Also as mentioned herein, the match profiles of the peers are generated using user provided data in the form of responses to various stimuli. In at least one embodiment, the presented grouping may function as stimuli presented to the peer, and the peer-response may be utilized as data in the updating of the match profile of the peer. In the process of updating the peer's match profile, one or more of the aforementioned factors relevant to establishing a successful relationship may be discerned from through user participation as a peer. This may include, for example, identifying "deal-breakers." If, for example, the peer often indicates groupings of smokers and non-smokers is not likely to result in a satisfactory relationship, the peer's match profile may be updated to indicate that the smoker/non-smoker factor should be weighted more heavily in calculating the compatibility value and/or match value. Additionally, this may take the form of identifying trends in groupings that the peer has identified as "successful" and with whose respective users the peer's match profile is similar, and/or with whose respective users the peer is a potential match. For example, if when the peer is presented with groupings involving a particular user who has a similar profile, the peer-reviews logged by that peer indicate many "successful" groupings are with potential matches that share a particular factor (e.g. blonde, athletic, intellectual, etc.), the updated profile may reflect the peer's preference, by, for example, giving additional weight to that factor. The Carter application discusses an exemplary approach to generating match profiles in response to presented stimuli, and is hereby incorporated by reference in its entirety. In the process of updating the match profile of the peer, the profile generation engine 1220 may regenerate the peer's match profile and store the updated match profile in the database 1240 according to the peer's user identification. In this manner, the peer-review can be used to further tailor the factors utilized in calculating the compatibility value and/or the resulting match value.

Figure 4:
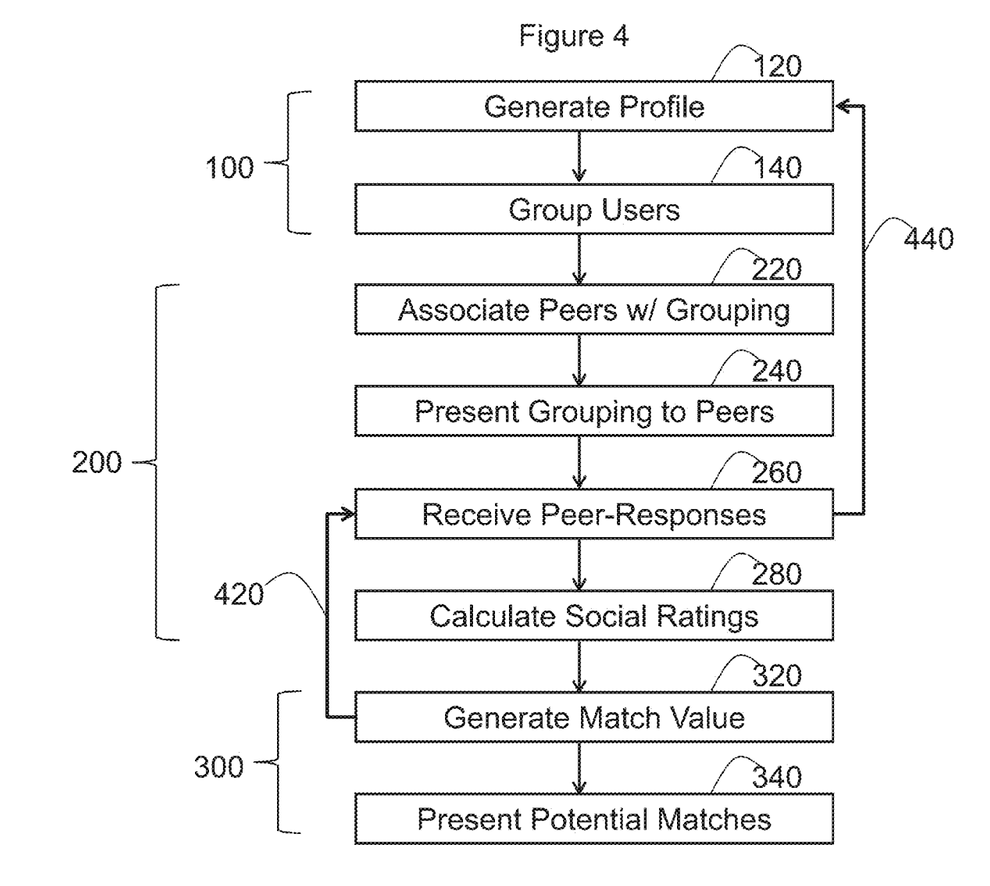
FIG. 4 is a flow-chart of an exemplary matching process according to a preferred embodiment of the present invention.

Turning now to FIG. 4, an exemplary process in accordance with a preferred embodiment of the present invention is shown.

At action group 100 the match engine 1260 correlates the user's profile to other profiles to form groupings of two or more users, according to the embodiments described herein. Each user establishes their respective profile that includes factors generated by the profile generation engine 1220 from data collected from that user (action block 120). As discussed herein, each user may provide data and/or factors that are potentially relevant to establishing a successful interpersonal relationship for that user. These data and/or factors may be indicative of qualities desired of the potential match and/or desirable as the potential match. This information may then be used by the profile generation engine 1220 to generate the user's profile, which may be stored in the database 1240 and organized by the user's profile identification. In the course of calculating the match value, the match engine 1260 queries the user's profile by its profile identification, and correlates the retrieved profile to other profiles to form groupings of two or more users which may be identified according to respective grouping identifications (action block 140), as discussed herein.

At action group 200 the match engine 1260 receives peer-responses associated with each grouping and calculates one or more social ratings therefrom that may be stored in the database 1240 and organized according to one or more of: the associated peers, and the associated grouping or its respective users, according to the embodiments described herein. The social rating is an aggregate of the peer-responses, and may be an average, adjusted average, or other aggregate indicating the overall peer response to the grouping. In the process of calculating a social rating for the grouping, the match engine 1260 may apply one or more social rating algorithms to the peer-responses, as described herein.

In the process of calculating the social rating for the grouping, the peer-selection module 1262 may associate peers with groupings according to the peer-review process described herein (action block 220). As discussed herein, these peers may be third party participants, or other users of the system. The peer-selection module 1262 may identify the peer and cause the match engine 1260 to present the grouping to the peer, preferably verifying that the peer is not part of the grouping, as discussed herein.

In the process of calculating the social rating for the grouping, the match engine 1260 may present the grouping, preferably including respective profile data (e.g. photo, age, occupation, political affiliation, etc.), to one or more peers for review (action block 240), according to the embodiments described herein. Presentation of the grouping may occur via visual juxtaposition of the respective profile data 1420 for comparison by the peer, as described herein, in conjunction with response fields 1440 for accepting peer-responses indicative of the reviewing peer's prediction of the likelihood of a successful relationship for the grouping, also as described herein.

In the process of calculating the social rating for the grouping, the match engine 1260 may receive the peer-responses and to store them in the database 1240 according to the respective user's profile identification and/or grouping identification for retrieval by query (action block 260), as described herein.

In the process of calculation the social rating for the grouping, the match engine 1260 may retrieve the peer-responses from the database 1240 and calculate the social ratings therefrom, which may be stored in the database 1240 for retrieval by query, and organized according to one or more of: the associated peers, and the associated grouping or its respective users (action block 280), as described herein. The social rating is an aggregate of the peer-responses, and may be an average, adjusted average, or other aggregate indicating the overall peer response to the grouping. In the process of calculating a social rating for the grouping, the match engine 1260 may apply one or more social rating algorithms to the peer-responses, as described herein. For example, the social rating may be calculated as a simple average score across all peers who have provided a rating, such as by the following algorithm:

$$\text{social rating} = \text{sum}(\text{value\_peer-response}))/(\#\_\text{of\_peers})$$

In at least one embodiment, a feedback algorithm may be used to create success or value weights for each peer, as described herein, and the social rating may be computed as a composite of responses and weights from a number of peers, such as the following linear composite algorithm:

$$\text{social rating} = \text{sum}(\text{weight\_peer-response}_n \times \text{value\_peer-response}_n)$$

At action group 300, if the match value derived from at least the social rating, according to the embodiments described herein, exceeds the predefined threshold, then there is potential for the respective users to have a satisfactory and/or successful interpersonal relationship if matched, and the match engine 1260 may present respective users of the grouping with their potential match. Such presentation may take the form of presenting profile data 1420 of the potential match (e.g. photo, age, sex, location, etc.). The respective users may then determine whether to follow-up on the suggested grouping, as described herein. Else, respective users may not be potential matches and their respective profiles may not be presented to each other. As described herein, in addition to presenting match profile data 1420, the match engine 1260 may also present the social rating of the grouping to the respective users.

In the process of presenting the user with potential matches, the match value may be generated from at least the social rating, in accordance with the embodiments described herein (action block 320). As discussed herein, the match value may equal the social rating. Additionally, the match value may be generated from the social rating and one or more of the herein identified factors potentially relevant to establishing a successful interpersonal relationship. For example, the match value may be calculated according to the following algorithm:

(Male Age Fit+Female Age Fit+Distance Fit+Social Rating)/4 where:

Male Age Fit:(1−|Male Age−Female's Target Age|/ Female Target Age)

Female Age Fit:(1−|Male's Target Age−Female Age|/ Male Target Age)

Distance Fit:(1−male zip code centroid to female zip code centroid distance in miles/50)

The match value may also be generated according to the compatibility value derived from the correlation of the respective user profiles of the grouping, according to the embodiments described herein. Consequently, the match value for the grouping may be calculated according to the generated social ratings and compatibility values associated therewith. In at least one embodiment, the calculation of compatibility value exceeding the predetermined threshold prior to the peer-review process may cause the match engine 1260 to present the potential match to the user according to the descriptions herein.

In the process of presenting the user with potential matches, if the match value derived from at least the social rating exceeds the predefined threshold the match engine 1260 may present respective users of the grouping with their potential match (action block 340), according to the embodiments described herein. As described herein, this may take the form of presenting profile data of the potential match (e.g. photo, age, sex, location, etc.) in response to which, respective users may then determine whether to follow-up on the suggested grouping. Preferably, the user is presented with profile data 1420 of the potential match (and vice versa) via the user interface device 1400. The social rating of the grouping may also be presented to the respective users, as described herein.

At action loop 420, the match value may be periodically updated to incorporate newly received peer-responses, according to the embodiments described herein. Preferably, when a new peer-response is received, the match engine 1260 may query the database 1240 for the social ratings associated with the grouping, according to action blocks 280. The match engine 1260 may then recalculate, or otherwise incorporate the new peer-response into, the social rating per action block 280. The new peer-response and the updated social rating may then be stored in the database 1240, per action block 280. Thus, as the grouping continues to be reviewed, the social rating (and therefore the match value) is kept substantially current. In this way potential matches may be presented that would not have otherwise been presented (or vice versa).

At action loop 440, the peer-response may be utilized as data in the updating of the match profile of the peer, according to the embodiments described herein. Preferably, the peer-review may provide data for use in generating (or updating) the peer's profile according to action block 120. As described herein, one or more of the aforementioned factors relevant to establishing a successful relationship may be discerned from through user participation as a peer. This may include, for example, identifying "deal-breakers," or trends in groupings that the peer has identified as "successful" and with whose respective users the peer's match profile is similar, and/or with whose respective users the peer is a potential match. In this manner, the peer-review can be used to further tailor the factors utilized in calculating the compatibility value and/or the resulting match value.

The enablements described in detail herein are considered novel over the prior art of record and are considered critical to the operation of at least one aspect of the invention and to the achievement of the herein described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

It shall be understood that all references to exemplary algorithms are highly simplified examples, intended as non-limiting conceptual illustrations.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described herein, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A system for identifying potential matches for interpersonal relationships comprising:
   a computer server including a processor coupled to a memory, the computer server coupled to one or more user interface devices operable to interface with the computer server via a public network;
   a computer database for retrievably storing a first user profile associated with a first user, and a second user profile associated with a second user;
   wherein the computer server is programmed to:
   (a) selectively display to a third user the first user profile in juxtaposition with the second user profile;
   (b) receive a peer-evaluation from the third user, the peer-evaluation reflecting the third user's prediction of the likelihood of a successful interpersonal relationship forming between the first and second users;
   (c) calculate a match value based at least partially on the received peer-evaluation, the match value reflecting the likelihood of a successful interpersonal relationship forming between the first and second users;

(d) if the calculated match value exceeds a predetermined threshold, selectively display the first user profile to the second user and/or the second user profile to the first user.

2. The system of claim 1, wherein the computer server is further programmed to select the first and second user profiles from a plurality of user profiles stored in the database according to a compatibility value calculated based on the first and second user profiles.

3. The system of claim 1, wherein the computer server is further programmed to generate a social rating from one or more peer-evaluations, and wherein the match value is calculated from at least the social rating.

4. The system of claim 3, wherein the computer server is further programmed to generate a compatibility value for the first and second users based on the first and second user profiles, and wherein the match value is calculated from at least the social rating and the compatibility value.

5. The system of claim 3, wherein the computer server is further programmed to display on the user interface device of the first user the social rating in connection with the displayed profile of the second user.

6. The system of claim 3, wherein the third user includes one or more third users each having a user profile, and wherein computer server is further programmed to calculate the social rating according to the respective user profiles of each third user.

7. The system of claim 6, wherein the social rating is calculated according to commonalities among the respective user profiles of each third user.

8. The system of claim 3, wherein the social rating is an average of a plurality of peer-evaluation.

9. The system of claim 3, wherein the social rating is a weighted average of a plurality of peer-evaluation.

10. The system of claim 1, wherein the computer server is further programmed to generate user profiles from user submitted data.

11. The system of claim 10, wherein the computer server is further programmed to generate user profiles at least partially according to peer-evaluations.

12. The system of claim 1, wherein the interpersonal relationship is selected from the following types of interpersonal relationships: dyadic, romantic, friendship, business, social, recreational, team oriented, long-term, and short-term.

13. A method for presenting recommendations regarding the likelihood of a successful interpersonal relationship, comprising the steps of:

(a) retrieving a first user profile associated with a first user and a second user profile associated with a second user from a database for storing the first user profile and the second user profile;

(b) displaying the first user profile and the second user profile in juxtaposition to a third user;

(c) receiving a peer-evaluation from the third user, the peer-evaluation reflecting the third user's prediction of the likelihood of a successful interpersonal relationship forming between the first and second users;

(d) calculating a match value based at least partially on the received peer-evaluation, the match value reflecting the likelihood of a successful interpersonal relationship forming between the first and second users;

(e) if the calculated match value exceeds a predetermined threshold, presenting the first user profile to the second user and/or the second user profile to the first user.

14. The method of claim 13, wherein the step of calculating the match value includes:

generating a compatibility value from the first and second user profiles; and calculating the match value from the peer-evaluation and the compatibility value.

* * * * *